Sept. 1, 1931.  W. E. THAU  1,821,332

CONTROL SYSTEM

Filed Dec. 24, 1927

INVENTOR
Walter E. Thau

BY
*Wesley G. Carr*
ATTORNEY

Patented Sept. 1, 1931

1,821,332

UNITED STATES PATENT OFFICE

WALTER E. THAU, OF SOUTH ORANGE, NEW JERSEY, ASSIGNOR TO WESTINGHOUSE ELECTRIC & MANUFACTURING COMPANY, A CORPORATION OF PENNSYLVANIA

CONTROL SYSTEM

Application filed December 24, 1927. Serial No. 242,349.

This invention relates to electric controllers, and more particularly to manually-operable switching devices.

An object of the invention, generally stated, is to provide a manually-operable controller with means for effecting the actuation of an auxiliary switch, when the controller is disposed in a predetermined position.

A more specific object is to provide, in a controller, for effecting the actuation of an auxiliary switch automatically when a manually-operated controller handle is actuated to its neutral position and allowed to remain there by the operator.

Other objects will become apparent in the description given hereinafter, when read in conjunction with the accompanying drawings, in which Figure 1 is a view, in side elevation, of a manually operable controller embodying the invention.

In the operation of dynamo-electric machines, and especially in the control of direct-current reversible motors, it is common practice to effect their reversal by simply reversing the direction of the current flowing in the armatures of the motors. This may be accomplished by means of a reversing switch, similar to the switches illustrated in the accompanying drawings.

In systems of the character described, the field windings of the motors are frequently connected directly across the source of supply, and disposed in the system in such a manner as not to be interrupted during the operation of the motor. In such systems, without means for automatically or positively disconnecting the field windings from the source of supply when the motors are not operating, the field windings may be inadvertently left connected to the line.

In order to positively prevent the motor field windings from being left in an energized condition when the motor is not in operation, the inventor provides an auxiliary switch and means for actuating it to interrupt the shunt field winding circuit when the motor-control switch is moved to its neutral or "off" position.

Figure 1:
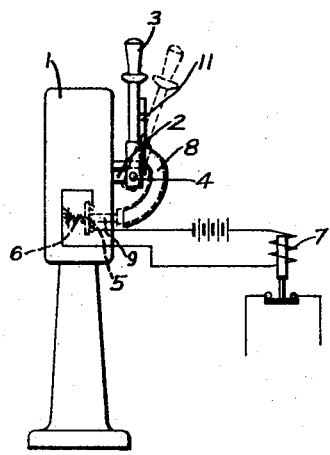

Referring more specifically to Fig. 1, which illustrates an embodiment of the invention, a supporting frame 1 for a controller is shown, which may be a cast or fabricated structure suitable for supporting and housing the controlling mechanism. The main control mechanism is not shown in the drawings, inasmuch as it comprises no part of the invention. The actuating means for the control mechanism however, is shown as a shaft 2 to which an operating handle 3 may be pivotally connected, as shown, by means of a pin or key 4. The purpose of the handle 3 is to actuate the controller to different positions, as illustrated in dotted lines in Fig. 2.

An auxiliary switch 5, which may be normally biased to its circuit-closing position by a spring 6, is provided for controlling the motor field circuit when the operating handle 3 is allowed to remain in its neutral or "off" position. The auxiliary switch may be disposed, in any suitable manner, inside the frame 1. As shown, the auxiliary switch 5 may be utilized for effecting the actuation of a relay or contactor 7, which may be connected in circuit with the shunt-field-winding circuit of a reversible motor.

In order that the auxiliary switch 5 may be opened by the operating handle 3 of the controller when the handle is in the "off" or neutral position, an unbalancing member 8 is provided which may project from the handle to normally bias it to move in a plane at right angles to the face of the controller.

The unbalancing member may take the form of a semi-circular projection as shown in Fig. 1, and may be disposed to impinge upon a plunger 9 connected to the bridging member of the switch 5, effecting the actuation of that switch to an open position when the handle 3 is released by the operator when in the "off" position.

Figure 2:
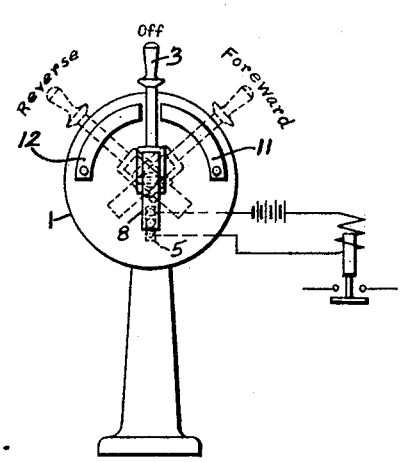
Fig. 2 is a view, in front elevation, of the same controller showing various positions of the operating handle.
Figure 3:
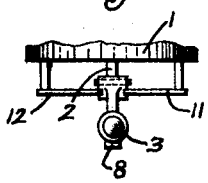
Fig. 3 is a top or plan view of the controller illustrating the guide members which are provided for holding the operating handle in such position as to prevent operation of the auxiliary switch when the handle is moved to its various operating positions.

In order that the unbalancing projection or portion 8, coupled to the handle 3, shall not cause the switch 5 to open when the handle 3 is in other than its "off" position, guide members 11 and 12 are mounted upon the face of the controller frame. The operating handle 3 is disposed to slide within the guide members 11 and 12, as illustrated in Figs. 2 and 3, when being moved between its various operating positions. The guide members 11 and 12 restrain the handle 3 from being carried away from the face of the controller through the influence of the projection 8, while in its various operating positions, such as those shown in dotted lines in Figs. 2 and 3.

Sufficient space is allowed between the guide members 11 and 12 to permit the handle 3 to be moved to the position shown in dotted lines in Fig. 1 for actuating the switch 5 when it is moved to the "off" position. Accordingly, it will be readily understood that, whenever the actuating handle is allowed to remain in the "off" position, it will automatically effect the operation of the auxiliary switch 5, and operate the relay circuit shown in the drawings.

Figure 4:
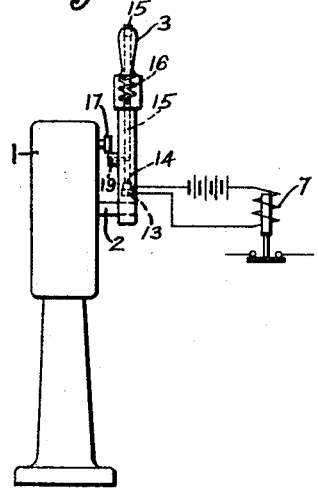
Fig. 4 is a view, in side elevation, of a similar controller showing a slight modification of the invention.
Figure 5:
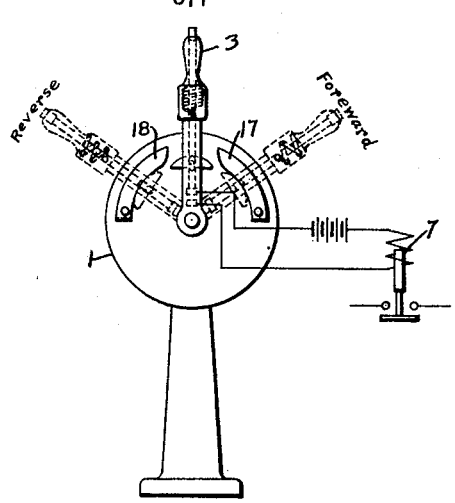
Fig. 5 is a view, in front elevation, of the controller shown in Fig. 3, illustrating various positions of the handle and auxiliary-switch mechanism.

Referring to Figs. 4 and 5, another embodiment of the invention is illustrated wherein means is disposed within the handle 3 for effecting the interruption of a circuit when the operating handle 3 is in its "off" or neutral position. In this form of the invention, as will be observed, the manually-operated handle 3 is fixedly secured to the shaft 2 for effecting the operation of the controller, and, near the base of the handle, a fixed contact member 13 may be mounted to cooperate with a movable contact member 14, disposed within the handle, to control a circuit, such as the relay circuit illustrated.

The movable contact member 14 may be disposed at the end of a shaft member inserted in a central portion of the operating handle, and biased into circuit-interrupting position by a resilient or spring member 16.

As illustrated, the spring 16 may be secured in any suitable position, but, in this embodiment, it is shown disposed near the top of the handle 3. The shaft member 15 is allowed to project above the top of the handle 3 so that the operator may keep the relay circuit closed when he has hold of the operating handle.

In order to retain the contact members 13 and 14 closed when the handle 3 is moved to its operating positions, a pair of guide members 17 and 18 are provided and so mounted on the frame 1 as to engage a lug or stop member 19 that is attached to the shaft 15, as illustrated in Figs. 4 and 5.

In this embodiment of the invention, it will be readily seen that, should the operator leave the controller with the control handle 3 in the neutral position, the auxiliary contact members 13 and 14 would open and interrupt the circuit to the relay 7.

While I have illustrated the invention in different forms it is apparent that further modifications may be made in the arrangement of the parts employed without departing from the spirit of the invention. It will, therefore, be understood that it is not desired that the invention shall be limited to the specific apparatus illustrated but that only such limitations shall be imposed as are indicated in the appended claims.

I claim as my invention:

1. In a controller, in combination, a frame for supporting the controller, a shaft for operating the controller, a manually operable handle pivotally secured to said shaft for actuating the controller to different operating positions and to a neutral position, an auxiliary switch mounted on the controller, an unbalancing member supported on the handle and disposed to normally bias the handle towards actuating engagement with the auxiliary switch, and guide members disposed on the controller frame for preventing the handle from actuating the auxiliary switch when the handle is in a position other than the neutral position.

2. In a controller, in combination, a controller shaft, a handle for actuating the controller shaft, said handle being disposed for oscillatory movement in two planes, a weight carried by the handle and disposed to actuate it in one plane when it stands in a predetermined position, and an auxiliary switch disposed to be actuated when said handle is oscillated by the weight.

3. In a controller, in combination, a controller shaft, a handle for actuating the controller shaft, said handle being disposed for oscillatory movement in two planes, a weight carried by the handle and disposed to actuate it in one plane when it stands in a predetermined position, an auxiliary switch disposed to be actuated when said handle is oscillated by the weight, and means disposed to engage the handle when it is oscillated in the other plane to prevent its actuation by the weight.

In testimony whereof, I have hereunto subscribed my name this fourteenth day of December, 1927.

WALTER E. THAU.